Patented July 3, 1945

2,379,644

UNITED STATES PATENT OFFICE 2,379,644

RIBOFLAVIN SOLUTION

Robert S. Shelton, Mariemont, Ohio, assignor to The Wm. S. Merrell Company

No Drawing. Application July 15, 1943,
Serial No. 494,849

4 Claims. (Cl. 167—81)

This invention relates to an injectable solution containing riboflavin along with other factors of the vitamin B complex if desired, and which has a riboflavin content of about 2 mg. per cc. and is nevertheless stable, even at temperatures as low as 4° C.

Injectable vitamin solutions including liver solids, and various factors of the vitamin B complex such as thiamine, nicotinamide, riboflavin, vitamin $B_6$ and pantothenic acid are known. In such solutions, the amount of riboflavin is less than 1 mg. per cc. because the solubility of the riboflavin in the products is not sufficiently high to produce stable solutions containing more than about 1 mg. per cc., and the various factors are not present in the proper relative proportions because the amount of riboflavin is too low.

The present invention is based upon the discovery that by using a liver solution, i. e., liver extract, containing a high percentage of liver solids, that is, from 200 to 350 mg. per cc., advantageously about 300 mg. per cc., stable solutions which contain as much as 2 mg. per cc., of riboflavin, or somewhat more, may be prepared and that such solutions are stable, even at low temperatures.

In accordance with the present invention, injectable vitamin solutions containing such vitamins or vitamin constituents as are desired, and in particular factors of the vitamin B complex with sufficient riboflavin so that the various constituents are present in the proper relative amounts, are prepared through the use of liver solutions containing 200 to 350 milligrams per cc. of liver solids, and about 2 mg. per cc. of riboflavin.

A typical product, for example, contains 300 milligrams per cc. of liver solids, 6 mg. per cc. of thiamine hydrochloride, 15 mg. per cc., of nicotinamide, 2 mg. per cc. of riboflavin, 0.5 mg. per cc. of vitamin $B_6$, 0.25 mg. per cc. of pantothenic acid, 2% of benzyl alcohol and 0.3% of cresol. This product is injectable, may be put up in ampules, and contains, in the proper proportions, the vitamin B complex factors. Without the high liver solids content, sufficient riboflavin to have the various vitamin constituents in proper proportions cannot be included in the solution.

I claim:

1. An aqueous liver solution containing riboflavin, the liver solids content being at least 200 mg. per cc. and the riboflavin content about 2 mg. per cc.

2. An aqueous liver solution containing riboflavin, the liver solids content being at least 200 mg. per cc. and the riboflavin content in excess of the water solubility of riboflavin.

3. An aqueous liver solution containing riboflavin, the liver solids content being about 300 mg. per cc. and the riboflavin content in excess of the water solubility of riboflavin.

4. An aqueous liver solution containing riboflavin, the liver solids content being about 300 mg. per cc. and the riboflavin content about 2 mg. per cc.

ROBERT S. SHELTON.